United States Patent
Ernst

(10) Patent No.: US 11,097,699 B2
(45) Date of Patent: Aug. 24, 2021

(54) METHOD FOR ACTIVATING A PARKING BRAKE OF A MOTOR VEHICLE, AND SYSTEM FOR CONTROLLING A PARKING BRAKE OF A MOTOR VEHICLE

(71) Applicant: AUDI AG, Ingolstadt (DE)

(72) Inventor: Herbert Ernst, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 188 days.

(21) Appl. No.: 16/475,448

(22) PCT Filed: Nov. 15, 2017

(86) PCT No.: PCT/EP2017/079311
§ 371 (c)(1),
(2) Date: Jul. 2, 2019

(87) PCT Pub. No.: WO2018/137808
PCT Pub. Date: Aug. 2, 2018

(65) Prior Publication Data
US 2019/0337495 A1    Nov. 7, 2019

(30) Foreign Application Priority Data

Jan. 24, 2017  (DE) .......................... 102017201066.5

(51) Int. Cl.
*B60T 7/12*    (2006.01)
*B60Q 5/00*    (2006.01)
*B60Q 9/00*    (2006.01)

(52) U.S. Cl.
CPC ................ *B60T 7/12* (2013.01); *B60Q 5/005* (2013.01); *B60Q 9/00* (2013.01); *B60T 2210/30* (2013.01);

(Continued)

(58) Field of Classification Search
CPC .. B60T 13/74; B60T 13/741; B60T 2201/022; B60T 2201/03; B60T 2201/06;
(Continued)

(56) References Cited

U.S. PATENT DOCUMENTS 5,521,442 A     5/1996  Butterfield et al.
6,139,117 A  * 10/2000  Shirai .................... B60T 13/74
                                              188/1.11 R
(Continued)

FOREIGN PATENT DOCUMENTS

DE         10357121 A1    7/2005
DE      102004050052 A1    5/2006
(Continued)

OTHER PUBLICATIONS

English language translation of International Preliminary Report on Patentability dated Aug. 8, 2019 in corresponding International Application No. PCT/EP2017/079311; 8 pages.

(Continued)

*Primary Examiner* — Tyler J Lee
(74) *Attorney, Agent, or Firm* — Maier & Maier, PLLC

(57) ABSTRACT

A method for activating a parking brake of a motor vehicle, wherein the parking brake is activated automatically if the motor vehicle is at a standstill or its ignition is switched off. The motor vehicle and/or the environment is detected subsequent to the automatic activation of the parking brake, and that said current situation is compared to stored situations of the motor vehicle and/or the environment, for which a rolling capability of the motor vehicle at a standstill and/or with its ignition switched off has been designated.

11 Claims, 1 Drawing Sheet

(52) U.S. Cl.
CPC ....... *B60T 2210/36* (2013.01); *B60T 2250/00* (2013.01)

(58) Field of Classification Search
CPC ............. B60T 2201/10; B60T 2210/30; B60T 2210/36; B60T 2250/00; B60T 7/12; B60T 7/122; B60T 7/22; B60T 8/172; B60Q 5/005; B60Q 9/00
See application file for complete search history.

(56) References Cited

U.S. PATENT DOCUMENTS

| | | | | |
|---|---|---|---|---|
| 6,701,242 | B1* | 3/2004 | Diebold | B60T 7/042 188/156 |
| 7,140,697 | B2* | 11/2006 | Koga | B60T 7/107 303/20 |
| 8,041,475 | B2* | 10/2011 | Fujita | B60T 13/746 701/30.3 |
| 8,322,473 | B2* | 12/2012 | Hilberer | B60T 8/17616 180/65.265 |
| 8,855,841 | B2* | 10/2014 | Doerr | B60L 3/00 701/22 |
| 10,093,297 | B2* | 10/2018 | No | B60T 17/22 |
| 10,293,800 | B2* | 5/2019 | Yokoyama | F16D 65/18 |
| 2004/0113489 | A1* | 6/2004 | Iwagawa | B60T 8/17616 303/155 |
| 2005/0029859 | A1* | 2/2005 | Bensch | B60T 13/68 303/89 |
| 2008/0090702 | A1* | 4/2008 | Hopf | B60T 7/085 477/197 |
| 2008/0191546 | A1* | 8/2008 | Plantamura | B60T 7/12 303/28 |
| 2008/0262687 | A1* | 10/2008 | Fujita | B60T 7/12 701/70 |
| 2014/0206502 | A1* | 7/2014 | Dix | B60W 30/18045 477/68 |
| 2015/0046071 | A1* | 2/2015 | Clarke | G01F 23/2965 701/112 |
| 2015/0344004 | A1* | 12/2015 | Al-Regib | B60W 30/1819 701/51 |
| 2016/0362089 | A1 | 12/2016 | Lapeer et al. | |
| 2018/0244283 | A1* | 8/2018 | Gei Enhoner | F16H 63/48 |

FOREIGN PATENT DOCUMENTS

| | | |
|---|---|---|
| DE | 102011003183 A1 | 7/2012 |
| DE | 202013005826 U1 | 9/2014 |
| DE | 102013209242 A1 | 11/2014 |
| DE | 10 2013 215 195 A1 | 2/2015 |
| DE | 10 2015 011 498 A1 | 3/2016 |
| DE | 102016102123 A1 | 8/2016 |
| DE | 10 2015 212 558 A1 | 1/2017 |
| EP | 2698294 A1 | 2/2014 |

OTHER PUBLICATIONS

International Search Report and Written Opinion dated Jan. 29, 2018 in corresponding International Application No. PCT/EP2017/079311; 29 pages.

German Search Report dated Feb. 11, 2021, in connection with corresponding DE Application No. 10 2017 201 066.5 (18 pp., including machine-generated English translation).

* cited by examiner

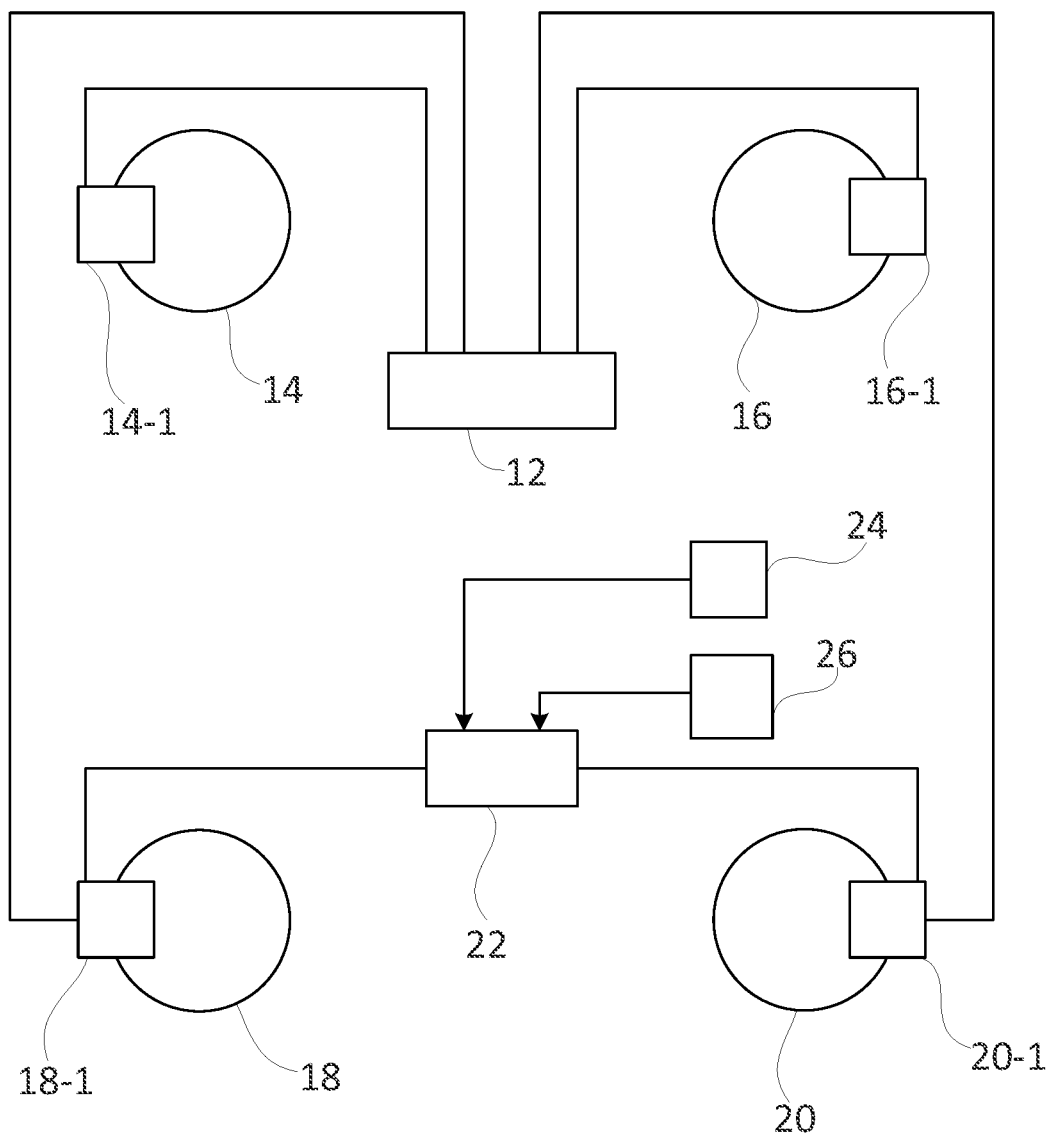

METHOD FOR ACTIVATING A PARKING BRAKE OF A MOTOR VEHICLE, AND SYSTEM FOR CONTROLLING A PARKING BRAKE OF A MOTOR VEHICLE

FIELD

The invention relates to a method for activating a parking brake of a motor vehicle, as well as a system for controlling a parking brake of a motor vehicle.

BACKGROUND

Electric parking brakes, also referred to in the following as electromechanical parking brakes or as electric emergency brakes, and corresponding methods for automatically activating said parking brake when the motor vehicle is at a standstill and/or the ignition is switched off are widely known from the prior art. In this context, DE 103 57 121 A1 is referenced merely as one example.

A known problem in electric emergency brakes occurs during the use of car wash facilities, as the parking brake is activated automatically after the motor vehicle enters the car wash facility and briefly comes to a standstill, with the result that the motor vehicle can no longer be conveyed through the car wash facility without first releasing the parking brake.

DE 10 2013 209 242 A1 discloses a method for activating and/or deactivating one or multiple driver assistance functions, namely a parking assistant and/or an Adaptive Cruise Control (ACC), while using car wash facilities. The method provides that a plurality of indicators for the vehicle's presence in a car wash facility or an automatic car wash facility are detected, and that the parking assistant and/or the Adaptive Cruise Control (ACC) are deactivated in dependence on the plurality of the detected indicators.

SUMMARY

The object underlying the invention is to further develop a method for activating an electric parking brake of a motor vehicle in such a manner that a rolling capability of the motor vehicle is ensured in situations that require the rolling capability of the motor vehicle.

According to the method, the electric parking brake is automatically activated in the known manner when the motor vehicle is at a standstill and/or the ignition is switched off.

According to the invention, it is provided that a current situation of the motor vehicle and/or the environment is detected subsequent to the automatic activation of the parking brake, and that the detected current situation of the motor vehicle and/or the environment is compared to stored situations of the motor vehicle and/or the environment, for which a rolling capability of the motor vehicle at a standstill and/or with its ignition switched off has been designated.

The method according to the invention proves to be particularly advantageous, as situations requiring a rolling capability of the motor vehicle, such as when the motor vehicle is located in a car wash facility, for example, can now be detected subsequent to the activation of the parking brake, such that a situational deactivation of the parking brake is made possible.

It is preferred in this context—if the detected current situation of the motor vehicle and/or the environment corresponds to a stored situation of the motor vehicle and/or the environment that requires the rolling capability of the motor vehicle—that a signal is sent to the vehicle operator, indicating that the parking brake is to be deactivated. Hereby, it is ensured—for example, if the motor vehicle is located in a car wash facility—that the vehicle operator is made aware of the issue of the required rolling capability at an early stage and thus has sufficient time to release the parking brake manually.

Preferably, it is indicated to the vehicle operator via a visual and/or acoustic signal that the parking brake is to be deactivated.

An alternative embodiment of the invention provides—if the detected current situation of the motor vehicle and/or the environment corresponds to a stored situation of the motor vehicle and/or the environment that requires the rolling capability of the motor vehicle—that the deactivation is executed automatically. The advantage of this embodiment is that the vehicle operator is not required to take further measures to release the parking brake, thereby preventing any "panic situations" that might occur, such as the vehicle operator feeling as though he/she cannot find the deactivating function quickly enough after entering the car wash facility, engaging the parking brake and subsequently being signaled that the parking brake is to be deactivated.

Preferably, the current situation of the motor vehicle and/or the environment is detected based on data obtained from environmental sensors and/or a GPS and/or a Car2X. This has the advantage, due to the data redundancy, that a high accuracy is ensured in the detection of the current situation of the motor vehicle and/or the environment.

According to a particularly advantageous embodiment of the invention, the environmental sensor data are provided by a camera present in the motor vehicle and/or a distance sensor (radar) present in the motor vehicle. It is advantageous herein that luxury-class vehicles usually are provided with a camera and a distance sensor as standard equipment, such that no separate or additional sensors need to be installed to detect the current situation of the motor vehicle and/or the environment.

Another object underlying the invention is to further develop a system for controlling a parking brake of a motor vehicle according to the type specified in the preamble of claim 7, such that an appropriate deactivation of the parking brake is made possible.

This object is achieved by the characterizing features of claim 7 in conjunction with its features included in the preamble.

In a manner generally known in the art, the system for controlling an electric parking brake of a motor vehicle comprises a controller device, which activates the parking brake in case of a standstill and/or switched-off ignition.

According to the invention, the controller device provides the controller device with another input value in the form of a detected current situation of the motor vehicle and/or the environment subsequent to the activation of the parking brake, wherein the controller device is set up to execute a comparison of the detected current situation of the motor vehicle and/or the environment with reference situations that require a rolling capability of the motor vehicle.

The system according to the invention proves to be particularly advantageous, as a review is performed subsequent to the activation of the electric parking brake to determine whether a rolling capability is required, such that a situational deactivation of the parking brake is made possible.

BRIEF DESCRIPTION OF THE DRAWINGS

Further advantages and potential applications of the present invention follow from the following description in conjunction with the exemplary embodiment shown in the drawing.

FIG. 1 shows a schematic representation of a brake system of a motor vehicle with an electric parking brake.

FIG. 1 shows a brake system for a motor vehicle, wherein the entire system is labeled with the reference number 10. The brake system 10 includes an ABS controller device 12, which can be used to control/regulate the brakes 14-1, 16-1, 18-1 and 20-1, which are associated with the wheels 14, 16, 18 and 20, in the manner generally known in the art.

DETAILED DESCRIPTION

Furthermore, the brake system 10 comprises a controller device 22 for the electric parking brake function via which the brakes 18-1 and 20-1 of the wheels 18 and 20 can be controlled/regulated.

The parking brake function of the brakes 18-1 and 20-1 can be activated via the controller device 22 when the vehicle is standing still.

As further shown in FIG. 1, data from a camera 24 and a distance sensor 26 are made available to the controller device 22 as input values.

When the motor vehicle is at a standstill, for example after entering a car wash facility, the electric parking brake function is activated for the brakes 18-1 and 20-1 of the wheels 18 and 20 via the controller device 22.

Subsequent to the automatic activation of the parking brake function, the current situation of the motor vehicle and/or the environment is detected by the controller device 22 based on the input values from the camera 24 and the distance sensor 26. Subsequently, the detected current situation of the motor vehicle and/or the environment is compared with reference situations stored in the controller device 22 that require a rolling capability of the motor vehicle at a standstill or with its ignition switched off, for example the situation of the motor vehicle being in a car wash facility.

After a determination has been made through said comparison that a rolling capability of the motor vehicle is required, the motor vehicle operator is notified acoustically and visually that the parking brake is to be deactivated, and the electric parking brake of the brakes 18-1 and 20-1 of the wheels 18 and 20 is deactivated via the controller device 22.

The invention claimed is:

1. A method for activating a parking brake of a motor vehicle, comprising:
    identifying that the motor vehicle is at a standstill and/or an ignition is switched off;
    activating the parking brake automatically when the motor vehicle is at the standstill or the ignition is switched off, wherein a current situation of the motor vehicle and/or an environment is detected subsequent to the automatic activation of the parking brake, and that said current situation is compared to stored situations of the motor vehicle and/or the environment, for which a rolling capability of the motor vehicle at a standstill or with the ignition switched off has been designated, and wherein the current situation of the motor vehicle and/or the environment is detected based on data obtained from environmental sensors.

2. The method according to claim 1, wherein if the detected current situation of the motor vehicle and/or the environment corresponds to a stored situation of the motor vehicle and/or the environment that requires the rolling capability of the motor vehicle a signal is sent to the vehicle operator, indicating that the parking brake is to be deactivated.

3. The method according to claim 1, wherein if the detected current situation of the motor vehicle and/or the environment corresponds to a stored situation of the motor vehicle and/or the environment that requires the rolling capability of the motor vehicle the parking brake is deactivated automatically.

4. The method according to claim 1, wherein the current situation of the motor vehicle and/or the environment is detected based on data obtained from a GPS and/or a Car2X.

5. The method according to claim 3, wherein the environmental sensor data are provided by a camera present in the motor vehicle and/or a distance sensor present in the motor vehicle.

6. The method according to claim 2, wherein the vehicle operator is notified of the deactivation of the parking brake via a visual and/or acoustic signal.

7. The method according to claim 2, wherein if the detected current situation of the motor vehicle and/or the environment corresponds to a stored situation of the motor vehicle and/or the environment that requires the rolling capability of the motor vehicle the parking brake is deactivated automatically.

8. The method according to claim 2, wherein the current situation of the motor vehicle and/or the environment is detected based on data obtained from a GPS and/or a Car2X.

9. The method according to claim 6, wherein if the detected current situation of the motor vehicle and/or the environment corresponds to a stored situation of the motor vehicle and/or the environment that requires the rolling capability of the motor vehicle the parking brake is deactivated automatically.

10. The method according to claim 6, wherein the current situation of the motor vehicle and/or the environment is detected based on data obtained from a GPS and/or a Car2X.

11. A system for controlling a parking brake of a motor vehicle, comprising:
    use of a controller device, which activates the parking brake when said vehicle is at a standstill and/or an ignition is switched off, wherein, subsequent to the activation of the parking brake, a detected current situation of the motor vehicle and/or an environment is provided to the controller device as an additional input value, and in that the controller device is set up to execute a comparison between the detected current situation of the motor vehicle and/or the environment and reference situations stored in the controller device that require a rolling capability of the motor vehicle when the vehicle is at the standstill and/or the ignition is switched off, wherein the current situation of the motor vehicle and/or the environment is detected based on data obtained from environmental sensors.

* * * * *